United States Patent
Yoshimi (10) Patent No.: US 11,898,045 B2
(45) Date of Patent: Feb. 13, 2024

(54) GOLD RESINATE SOLUTION FOR INKJET USE

(71) Applicant: Noritake Co., Limited, Nagoya (JP)

(72) Inventor: Takamasa Yoshimi, Nagoya (JP)

(73) Assignee: Noritake Co., Limited

(*) Notice: Subject to any disclaimer, the term of this patent is extended or adjusted under 35 U.S.C. 154(b) by 329 days.

(21) Appl. No.: 17/424,867

(22) PCT Filed: Dec. 9, 2019

(86) PCT No.: PCT/JP2019/048013
§ 371 (c)(1),
(2) Date: Jul. 21, 2021

(87) PCT Pub. No.: WO2020/153014
PCT Pub. Date: Jul. 30, 2020

(65) Prior Publication Data
US 2022/0089891 A1    Mar. 24, 2022

(30) Foreign Application Priority Data
Jan. 25, 2019 (JP) ................. 2019-011133

(51) Int. Cl.
*C09D 11/36* (2014.01)
*B41J 2/045* (2006.01)

(52) U.S. Cl.
CPC ........... *C09D 11/36* (2013.01); *B41J 2/04581* (2013.01)

(58) Field of Classification Search
CPC ...... B41J 2/211; B41J 2/5052; B41J 2/04581; B41J 2/01; B41J 2/21; C09D 11/36;
(Continued)

(56) References Cited

U.S. PATENT DOCUMENTS

| 2,490,399 A | 12/1949 | Ballard et al. |
| 5,972,483 A | 10/1999 | Sano et al. |

(Continued)

FOREIGN PATENT DOCUMENTS

| CN | 1363723 | 8/2002 |
| CN | 104403407 | 3/2015 |

(Continued)

OTHER PUBLICATIONS

Amari, et al.; Article entitled: "Chemistry for Inkjet printing", Japan Society of Colour Material, 72(11), p. 690-697, dated Sep. 13, 1999.
(Continued)

*Primary Examiner* — Kristal Feggins
(74) *Attorney, Agent, or Firm* — Taylor English Duma LLP (57) ABSTRACT

Provided by the present invention is a technology to realize a gold decoration on a surface of an inorganic substrate by inkjet printing. The gold resinate solution for inkjet printing disclosed herein is usable to provide an inorganic substrate with a gold decoration by inkjet printing. The gold resinate solution contains gold resin balsam sulfide; and a solvent dissolving the gold resin balsam sulfide. The gold resin balsam sulfide has a ratio ($I_{Au}/I_S$ ratio) of a peak intensity $I_{Au}$ derived from gold element (Au) with respect to a peak intensity $I_S$ derived from sulfur element (S), in X-ray fluorescence analysis, of 8.5 or higher. The gold resinate solution having an $I_{Au}/I_S$ ratio of 8.5 or higher may have the viscosity thereof kept low even if containing a large amount of gold, and therefore, may realize a gold decoration on an inorganic substrate by inkjet printing.

11 Claims, 4 Drawing Sheets

(58) Field of Classification Search
CPC ... C09D 11/328; C09D 11/037; C09D 11/322; C09D 11/40; C09D 17/004; C04B 41/88; B41M 5/00; B41M 5/50; B41M 1/18; B41M 1/20; B41M 1/22; B41M 5/5218
See application file for complete search history.

(56) References Cited

U.S. PATENT DOCUMENTS

| | | |
|---|---|---|
| 2005/0204956 A1 | 9/2005 | Berkei et al. |
| 2008/0277630 A1 | 11/2008 | Kiyoshima et al. |
| 2015/0240097 A1 | 8/2015 | Ruiz Vega et al. |

FOREIGN PATENT DOCUMENTS

| | | |
|---|---|---|
| CN | 104479449 | 4/2015 |
| CN | 105699453 | 6/2016 |
| CN | 106277793 | 1/2017 |
| CN | 108359316 | 8/2018 |
| JP | 62138379 | 6/1987 |
| JP | 4219382 | 8/1992 |
| JP | 7309877 | 11/1995 |
| JP | 9192594 | 7/1997 |
| JP | 9235169 | 9/1997 |
| JP | 11006072 | 1/1999 |
| JP | 11189483 | 7/1999 |
| JP | 2967742 | 10/1999 |
| JP | 2001039092 | 2/2001 |
| JP | 3321063 | 9/2002 |
| JP | 2004068114 | 3/2004 |
| JP | 2004182764 | 7/2004 |
| JP | 2004256319 A | 9/2004 |
| JP | 2006035205 | 2/2006 |

OTHER PUBLICATIONS

Decision to Grant a Patent for Japanese patent application No. 2019-011133, dated Sep. 24, 2020, 5 pgs.
Kato, Yoshinori; Article entitled: "FUJIFILM Group's Inkjet Printhead and Technology", published Nov. 7, 2013, 5 pgs.
Notice of Reason for Refusal for Japanese patent application No. 2019-011133, dated Feb. 20, 2020, 6 pgs.
Takahashi, Tadahachi, Article entitled: "Regarding a Gold Resinate Solution", Journal of the Japan Society of Colour Material, 27, p. 197-199, dated Jul. 9, 1954, 12 pgs.
Yoshimi, Takamasa; International Search Report and Written Opinion for PCT/JP2019/048013, filed Dec. 9, 2019, dated Mar. 10, 2020, 14 pgs.
Noritake Co., Limited; Office Action for Chinese patent application No. 201980089849.1, dated Aug. 11, 2022, 10 pgs.

GOLD RESINATE SOLUTION FOR INKJET USE

TECHNICAL FIELD

The present invention relates to a gold resinate solution for inkjet printing, and in more detail, to a gold resinate solution usable to provide an inorganic substrate with a gold decoration by inkjet printing. The present application claims priority based upon Japanese Patent Application No. 2019-011133 filed on Jan. 25, 2019, the entirety of which is incorporated herein by reference.

BACKGROUND ART

Some of ceramic items such as pottery and porcelain items, glass items, vitreous enamel items and the like have surfaces with gold decorations. Such a gold decoration is mainly provided in luxury goods or goods with high added values in order to impress viewers as being elegant or gorgeous. The gold decoration is formed by, for example, applying a gold-containing solution called a "gold resinate solution" to the surface of a target of decoration, which is to be decorated, and firing the target of decoration. The gold resinate solution is generally formed by dissolving an organic compound called "gold resin balsam sulfide (gold resinate)" in a predetermined solvent. The gold resin balsam sulfide is generated by, for example, reacting balsam sulfide and chloroauric acid with each other. Balsam sulfide is a reaction product of sulfur and turpentine, and chloroauric acid is generated by dissolving gold in aqua regina. Examples of such a gold resinate solution are disclosed in Patent Literature 1 through Patent Literature 4.

Conventionally used methods to decorate a surface of an inorganic substrate such as a ceramic item or the like include brush painting, screen printing and the like. Recently, it has been proposed to use inkjet printing to decorate the surface of the inorganic substrate. Inkjet printing does not require a technique of a skilled craftsman unlike brush painting, and is more easily usable, than screen printing, to produce various types of items in small amounts. Therefore, inkjet printing is considered to contribute to improve the production efficiency. For example, Patent Literature 5 describes a recording solution for inkjet printing (ink for inkjet printing) usable for pottery and porcelain items, and the like. The ink described in Patent Literature 5 contains a metal resinate salt such as bismuth resinate or the like, and develops the three primary colors used for the so-called subtractive color mixture, namely, yellow, cyan and magenta, or similar colors (blue, red). The ink described in Patent Literature 5 also contains a noble metal balsam-based compound such as gold balsam or the like, from the point of view of improving the color development capability and the hue adjustment capability.

CITATION LIST

Patent Literature

Patent Literature 1: Japanese Patent No. 2967742
Patent Literature 2: Japanese Patent No. 3321063
Patent Literature 3: Japanese Laid-Open Patent Publication No. S62-138379
Patent Literature 4: U.S. Pat. No. 2,490,399
Patent Literature 5: Japanese Laid-Open Patent Publication No. 2004-182764

SUMMARY OF INVENTION

Technical Problem

Unlike for the ink of the three primary colors described in Patent Literature 5 and black ink, no application technology using inkjet printing has been established yet for the gold resinate solution for gold decorations. Brush painting, screen printing or the like is still used to apply the gold resinate solution to an inorganic substrate.

The present invention made in light of such a situation has a main object of providing a technology to realize a gold decoration on a surface of an inorganic substrate using inkjet printing.

Solution to Problem

In order to achieve the above-described object, the present inventor attempted to apply a gold resinate solution onto a surface of an inorganic substrate by use of an inject printing device. As a result, it has been found out that unlike in the case of the ink of the three primary colors or the black ink conventionally used, it is difficult to adjust the viscosity of the gold resinate solution to such a level as to be appropriately ejectable through an ejection opening of the inkjet device. This will be described specifically. In order to form a gold decoration having a beautifully developed color, it is required to form a gold film having a sufficient thickness (e.g., 0.1 µm to 50 µm) after the applied gold resinate solution is fired. In order to form such a gold film, the gold resinate solution needs to contain a sufficient amount of gold. However, when the amount of the gold is large, the viscosity of the gold resinate solution is raised to make it difficult to eject the gold resinate solution through the ejection opening. As a measure against this, it is conceivable to prepare a gold resinate solution containing a small amount of gold and increase the number of times the gold resinate solution is ejected toward one same point (increase the number of printing times). However, such an increased number of printing times extends the printing time, which is against the object of using the inkjet printing of improving the production efficiency. In addition, drops of the ejected solution land at positions shifted from each other. This easily results in the drops adjacent to each other being combined to cause uneven printing.

In light of the above-described problems, the present inventor conceived that in order to realize a gold decoration by use of inkjet printing, it is required to prepare a gold resinate solution containing a large amount of gold and having a low viscosity. As a result of performing various experiments and examinations based on this idea, the present inventor found out that, surprisingly, in the case where the ratio ($I_{Au}/I_S$ ratio) of the peak intensity $I_{Au}$ derived from gold element (Au) with respect to the peak intensity $I_S$ derived from sulfur element (S), in X-ray fluorescence analysis of gold resin balsam sulfide in the gold resinate solution, is made high, the viscosity of the gold resinate solution may be kept low even if the amount of gold is large.

The gold resinate solution disclosed herein is formed based on the above-described knowledge and is a gold resinate solution for inkjet printing that is usable to provide an inorganic substrate with a gold decoration by inkjet printing. The gold resinate solution contains gold resin balsam sulfide; and a solvent dissolving the gold resin balsam sulfide. The gold resin balsam sulfide has a ratio ($I_{Au}/I_S$ ratio) of a peak intensity $I_{Au}$ derived from gold element (Au) with respect to a peak intensity $I_S$ derived from sulfur element (S), in X-ray fluorescence analysis, of 8.5 or higher.

The gold resinate solution may have the viscosity thereof kept low even if containing a large amount of gold, and therefore, may realize a gold decoration on an inorganic substrate by inkjet printing.

In a preferred embodiment of the gold resinate solution for inkjet printing disclosed herein, the gold resinate solution has a content of gold—and, more specifically here and throughout, contains the gold element Au— in a range of 5% by weight to 20% by weight. According to the technology disclosed herein, even in the case where a gold resinate solution having such a high content of gold is prepared, the viscosity thereof may be kept low. Therefore, the gold resinate solution may be ejected through an ejection opening of an inkjet device in a preferred manner.

In a preferred embodiment of the gold resinate solution for inkjet printing disclosed herein, the gold resinate solution has a viscosity of 25 mPa·s or lower. The gold resinate solution for inkjet printing disclosed herein contains a sufficient amount of gold even when the viscosity thereof is adjusted to 25 mPa·s or lower, and therefore, may form a high-quality gold decoration at a high efficiency.

In a preferred embodiment of the gold resinate solution for inkjet printing disclosed herein, the solvent contains at least one selected from the group consisting of N-methyl-2-pyrrolidone, benzyl alcohol and benzaldehyde. Each of these solvents may dissolve gold resin balsam sulfide in a preferred manner, and therefore, may prevent the ejection opening from being clogged with large particles.

According to the present invention, a method for producing a printed item is provided. The production method includes the steps of preparing an inorganic substrate; ejecting the gold resinate solution for inkjet printing according to any one of the above-described embodiments through an ejection opening of an inkjet device and attaching the gold resinate solution for inkjet printing onto a surface of the inorganic substrate; and firing the inorganic substrate having the gold resinate solution for inkjet printing attached thereto.

The production method disclosed herein uses the gold resinate solution for inkjet printing according to any one of the above-described embodiments, and therefore, may form a gold decoration on the surface of the inorganic substrate by inkjet printing. For this reason, a printed item having a high-quality gold decoration may be produced at a high production efficiency.

DESCRIPTION OF EMBODIMENTS

Hereinafter, preferred embodiments of the present invention will be described. Elements that are other than the elements specifically referred to in this specification and are necessary to carry out the present invention may be understood as a matter of design based on the prior art and known to a person of ordinary skill in the art. The present invention may be carried out based on the contents disclosed in this specification and the technological common knowledge of a person of ordinary skill in the art.

1. Gold Resinate Solution for Inkjet Printing

The gold resinate solution for inkjet printing according to this embodiment is used to provide an inorganic substrate with a gold decoration by use of inkjet printing. Such a gold resinate solution contains gold resin balsam sulfide and a solvent dissolving the gold resin balsam sulfide. Hereinafter, each of materials contained in the gold resinate solution for inkjet printing according to this embodiment will be described.

(1) Gold Resin Balsam Sulfide

Gold resin balsam sulfide is an organic compound containing gold (Au) and sulfur (S). There is no specific limitation on the procedure to prepare gold resin balsam sulfide to be contained in the gold resinate solution disclosed herein, and any conventionally known method is usable with no specific limitation. One example of the procedure to prepare such gold resin balsam sulfide is as follows. First, gold is dissolved in aqua regina (concentrated hydrochloric acid:concentrated nitric acid=3:1) to obtain chloroauric acid ($HAuCl_4$). Next, essential oil of turpentine, rosin, lavender oil or the like and sulfur are reacted with each other to prepare turpentine-based sulfide called balsam sulfide. Chloroauric acid and balsam sulfide are reacted with each other to obtain gold resin balsam sulfide.

Figure 1:
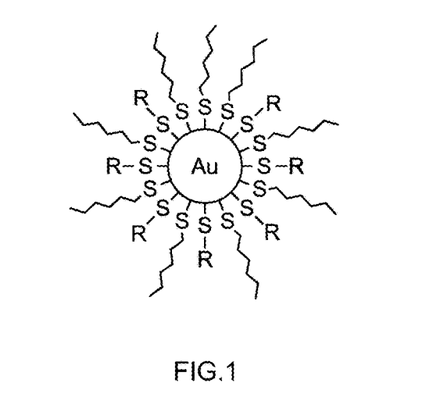
FIG. 1 is a schematic view showing a state of gold (Au) in a gold resinate solution for inkjet printing.

Gold resin balsam sulfide contained in the gold resinate solution according to this embodiment has a ratio ($I_{Au}/I_S$ ratio) of the peak intensity $I_{Au}$ derived from gold element (Au) with respect to the peak intensity $I_S$ derived from sulfur element (S), in X-ray fluorescence analysis, of 8.5 or higher. In the case where gold resin balsam sulfide having an $I_{Au}/I_S$ ratio of 8.5 or higher is used, the gold resinate solution may have the viscosity thereof kept low even if containing a large amount of gold. It has been confirmed by experiments that for this reason, use of gold resin balsam sulfide having such a high $I_{Au}/I_S$ ratio may realize a gold decoration on an inorganic substrate by use of inkjet printing. A conceivable reason why gold resin balsam sulfide having an $I_{Au}/I_S$ ratio of 8.5 or higher provides such an effect is the following, although the reason is not limited thereto. As shown in FIG. 1, it is considered that in gold resin balsam sulfide, gold (Au) and an essential oil component (R) polymerized as balsam sulfide are bonded to each other via sulfur (S). In this case, when the $I_{Au}/I_S$ ratio is increased, the number of sulfur atoms (S) bonded to gold (Au) is decreased. Therefore, the molecular weight of the essential oil component (R) bonded to, and located around, gold (Au) via sulfur (S) is decreased. As a result, the aggregation of gold atoms (Au) via the essential oil component (R) is suppressed, and thus the gold atoms (Au) may be dispersed in a preferred manner. It is considered that for this reason, the gold resinate solution may have the viscosity thereof kept low even if containing a large amount of gold.

The "$I_{Au}/I_S$ ratio of gold resin balsam sulfide" described above is calculated based on the results of element analysis on gold resin balsam sulfide performed by use of XRF. A specific procedure to find the $I_{Au}/I_S$ ratio is as follows. First, powdery gold resin balsam sulfide is applied to the inner peripheral side of an aluminum ring placed on a substrate, and the powdery gold resin balsam sulfide is press-molded into a disc shape by use of cellulose powder. Thus, a sample for measurement is obtained. The obtained sample for measurement is subjected to X-ray fluorescence analysis. The peak intensity (kcps) of an Au-Lαi analysis line and the peak intensity (kcps) of an S-K$\alpha_{1,2}$ analysis line are measured. The peak intensity of the Au-Lαi analysis line is divided by the peak intensity of the S-K$\alpha_{1,2}$ analysis line, and thus the $I_{Au}/I_S$ ratio of gold resin balsam sulfide may be found. In test examples described below, the $I_{Au}/I_S$ ratio of each of samples is calculated by substantially the same procedure.

<Conditions for XRF>
Measurement device: X-ray fluorescence analyzer produced by RIGAKU Corporation (type: ZSX Primus II)
Measurement atmosphere: vacuum
<Conditions for gold (Au) analysis>
X-ray tube: Rh tube
Tube voltage: 60 kV
Applied current: 60 mA
Filter: Be 30
Slit: S2
Analyzing crystal: LiF (reflecting surface 200)
Detector: Scintillation counter (SC)
PHA conditions: peak value of 100 to 300
<Conditions for sulfur (S) analysis>
X-ray tube: Rh tube
Tube voltage: 30 kV
Applied current: 100 mA
Filter: Be 30
Slit: S4
Analyzing crystal: Ge
Detector: Gas flow-type proportional counter (PC)
PHA conditions: peak value of 150 to 300

It has been confirmed by the experiments performed by the present inventor that as the $I_{Au}/I_S$ ratio is increased, the degree of rise in the viscosity caused by the increase in the amount of gold tends to become milder. From this point of view, it is preferred that the $I_{Au}/I_S$ ratio is 8.9 or higher. From the point of view of keeping the viscosity of the gold resinate solution low, there is no specific upper limit of the $I_{Au}/I_S$ ratio. The upper limit of the $I_{Au}/I_S$ ratio may be 100, 75, or 50. It should be noted that if the $I_{Au}/I_S$ ratio is too high (if the number of the sulfur atoms (S) bonded to gold (Au) is decreased too much), the number of the polymers bonded to gold via sulfur (S) is decreased too much. When this occurs, the gold atoms may undesirably be bonded to each other to form large particles of gold. In addition, there is an undesirable possibility that the amount of balsam sulfide to be reacted with chloroauric acid becomes insufficient and thus the production amount of the gold resin balsam sulfide is decreased. In consideration of these points, the upper limit of the $I_{Au}/I_S$ ratio is preferably 40, more preferably 30, still more preferably 25, and especially preferably 20 (e.g., 19.5). The $I_{Au}/I_S$ ratio may be made a desired value by, for example, adjusting the mixing ratio of an aqueous solution of chloroauric acid and balsam sulfide.

(2) Solvent

The solvent may be any organic solvent that may dissolve gold resin balsam sulfide. Any solvent that is used as a solvent for gold resinate solution may be used with no specific limitation. It is preferred that such a solvent contains at least one of, for example, 1,4-dioxane, 1,8-cineole, 2-pyrrolidone, 2-phenylethanol, N-methyl-2-pyrrolidone, p-tolualdehyde, benzyl benzoate, butyl benzoate, eugenol, caprolactone, geraniol, methyl salicylate, cyclohexanone, cyclohexanol, cyclopentylmethylether, citronellal, di(2-chloroethyl)ether, diethyleneglycolmonomethylether, diethyleneglycolmonobutylether, dihydrocarvone, dibromomethane, dimethylsulfoxide, dimethylformamide, nitrobenzene, pyrrolidone, propyleneglycolmonophenylether, pulegone, benzyl acetate, benzyl alcohol, benzaldehyde, and the like. Among the above-listed specific examples, benzyl alcohol, N-methyl-2-pyrrolidone, and benzaldehyde may dissolve gold resin balsam sulfide in a more preferred manner, and therefore, may prevent the ejection opening from being clogged with large particles more appropriately. The solvent is not limited to any of the above-listed specific examples and may partially contain a material having a low capability of dissolving gold resin balsam sulfide.

From the point of view of preventing the ejection opening from being clogged with undissolved particles, the amount of the solvent in the gold resinate solution is appropriately at least twice, preferably at least 2.5 times, more preferably at least three times, and still more preferably at least 4 times the mass of the substance to be dissolved (e.g., the total mass of gold resin balsam sulfide and additive(s) described below). From the point of view of keeping the amount of gold at an appropriate level to prevent decrease in the production efficiency or to prevent printing unevenness, the upper limit of the amount of the solvent is appropriately 20 times, preferably 15 times, more preferably 10 times, and still more preferably 7.5 times the mass of the substance to be dissolved. For example, the amount of the solvent is especially preferably about five times the mass of the substance to be dissolved.

(3) Viscosity of the Gold Resinate Solution

As described above, the gold resinate solution according to this embodiment has an $I_{Au}/I_S$ ratio adjusted to 8.5 or higher, and therefore, may have the viscosity thereof kept low even if containing a large amount of gold. In this case, the viscosity of the gold resinate solution is adjusted to 25 mPa·s or lower, preferably 15 mPa·s or lower, more preferably 13 mPa·s or lower, still more preferably 11 mPa·s or lower, and especially preferably 10 mPa·s or lower, for example, 8 mPa·s or lower. With such an adjustment, the gold resinate solution may be ejected through the ejection opening of the inkjet device in a preferred manner. The preferred viscosity of the gold resinate solution varies in accordance with the performance of the inkjet device, the diameter of the ejection opening, or the like. Therefore, it is preferred to appropriately adjust the viscosity of the gold resinate solution in consideration of these factors. The gold resinate solution according to this embodiment may contain gold at a high concentration, relative to the low viscosity required for the gold resinate solution to be ejected in a preferred manner.

The "viscosity of the gold resinate solution" in this specification is measured under the following conditions after each prepared sample is kept at 25° C. for 48 hours. Substantially the same conditions are adopted for the test examples described below.

<Conditions for Measuring the Viscosity>
Measurement device: Digital viscometer produced by Brookfield (type: LVDV-3T, with UL low-viscosity adaptor)
Temperature: 25° C.
Rotation rate: 10 rpm (4) Content of Gold The effect of the gold resinate solution for inkjet printing according to this embodiment is exhibited especially preferably in the case where the content of gold is 5% by weight or higher. Specifically, in order to efficiently form a gold decoration with a beautifully developed color, it is preferred that the content of gold in the gold resinate solution is 5% by weight or higher. Usually, in the case where a gold resinate solution having a high content of gold is prepared, the viscosity thereof is significantly raised to make it difficult to eject the gold resinate solution through the ejection opening. However, the gold resinate solution for inkjet printing according to this embodiment may be ejected through the ejection opening in a preferred manner even though having a content of gold of 5% by weight or higher. The reason for this is that the rise in the viscosity of the gold resinate solution, which would be caused by an increase in the content of gold, is suppressed. From the point of view of decreasing the number of times of printing to improve the production efficiency, the content of gold is more preferably 5.5% by weight or higher, still more preferably 7.5% by weight or higher, and especially preferably 10% by weight or higher. From the point of view of improving the ejectability through the ejection opening, the upper limit of the content of gold is preferably 20% by weight, more preferably 18% by weight, still more preferably 17% by weight, and especially preferably 16% by weight. The content of gold may be set to, for example, 15% by weight.

(5) Additives

The gold resinate solution for inkjet printing according to this embodiment may contain various additives in addition to the gold resinate balsam sulfide described above. Hereinafter, examples of the additives that may be incorporated into the gold resinate solution for inkjet printing will be described.

One example of the additives may be a metal element other than gold (Au). The metal elements, other than gold, that may be incorporated into the gold resinate solution include, for example, rhodium (Rh), bismuth (Bi), chromium (Cr), vanadium (V), molybdenum (Mo), zirconium (Zr), zinc (Zn), and the like. Incorporation of rhodium into the gold resinate solution may suppress generation of gold particles during the firing and thus may form a strong gold film. The amount of rhodium is preferably 0.1 to 2 parts by weight with respect to 100 parts by weight of gold. Incorporation of bismuth may form an intermediate layer between the gold film and the inorganic substrate to improve the adhesiveness of the gold film. The amount of bismuth is preferably 1 to 10 parts by weight with respect to 100 parts by weight of gold. Incorporation of chromium may suppress insufficient firing from being caused by contamination with impurities such as alkaline material or the like. The amount of chromium is preferably 0.1 to 2 parts by weight with respect to 100 parts by weight of gold. In the case where the target of decoration is an inorganic substrate that is difficult to be fired at a high temperature (e.g., a glass item, etc.), incorporation of vanadium may improve the fixing strength of the gold film. The amount of vanadium is preferably 0.1 to 2 parts by weight with respect to 100 parts by weight of gold. Incorporation of molybdenum, zirconium or zinc may contribute to decrease in the firing temperature and shortening of the firing time. It is preferred that the above-listed metal elements other than gold are incorporated into the gold resinate solution in a state of being reacted with balsam sulfide (in a state of being metal resin balsam sulfide), like gold.

Platinum (Pt), palladium (Pd), silver (Ag) or the like may also be incorporated into the gold resinate solution. When a gold resinate solution containing such a metal element is fired, a beautiful silver decoration may be formed on a surface of an inorganic substrate. The amount of the metal element for developing a silver color is preferably 0.5 to 5 parts by weight with respect to 100 parts by weight of gold. The color of the gold film may be adjusted by incorporation of platinum, palladium or silver in an amount smaller than 0.5 parts by weight. It is preferred that these metal elements for developing a silver color are also incorporated into the gold resinate solution in the state of being metal resin balsam sulfide.

The gold resinate solution may contain silicon (Si), indium (In), calcium (Ca) or the like. In the case where such a metal element is contained in the gold resinate solution, a non-conductive gold film may be formed. Therefore, for example, tolerance to use in a microwave oven may be provided. It should be noted that when the amount of such an element is too large, the color development capability of the post-firing gold film may undesirably be declined. In consideration of this, the amount of silicon is preferably 3 to 20 parts by weight with respect to 100 parts by weight of gold. The amount of indium is preferably 2 to 15 parts by weight with respect to 100 parts by weight of gold. The amount of calcium is preferably 2 to 20 parts by weight with respect to 100 parts by weight of gold.

The additive to the gold resinate solution for inkjet printing according to this embodiment is not limited to any of the above-listed materials, and any conventionally used additive may be used with no specific limitation. Namely, the gold resinate solution for inkjet printing according to this embodiment may contain any material conventionally used as an additive for the ink of the three primary colors for inkjet printing and the black ink for inkjet printing with no specific limitation in a range that does not spoil the effect of the present invention, as well as the additives for the gold resinate solution.

2. Method for Producing a Printed Item

Figure 2:
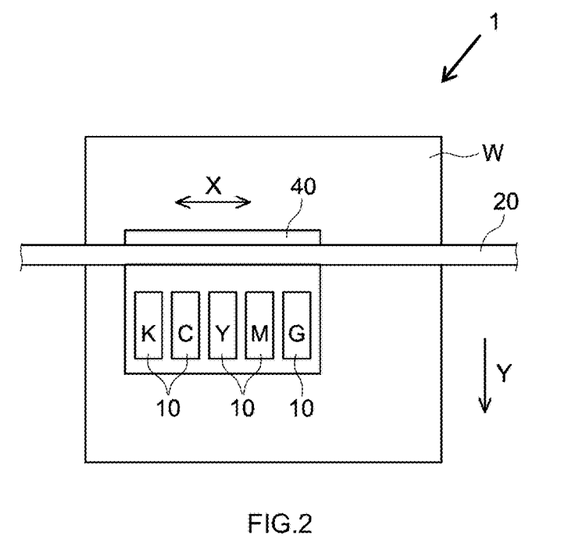
FIG. 2 is an overall view schematically showing an inkjet device usable for a production method according one embodiment of the present invention.
Figure 3:
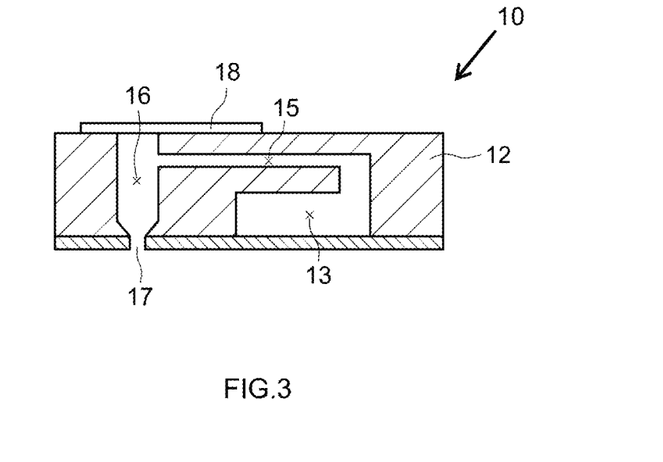
FIG. 3 is a cross-sectional view schematically showing an inkjet head in the inkjet device shown in FIG. 2.
Figure 4:
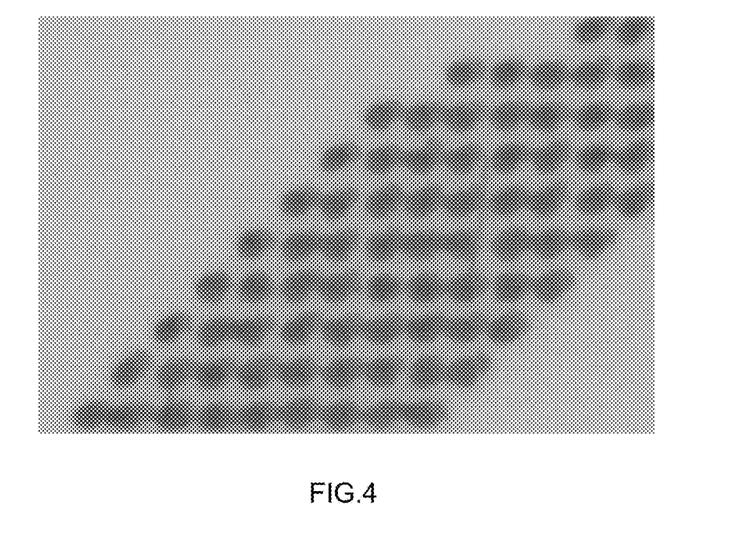
FIG. 4 is an enlarged photograph of a gold decoration of a printed item produced by the production method according to one embodiment of the present invention.

Now, with reference to FIG. 2 through FIG. 4, a method for producing a printed item according to one embodiment of the present invention will be described. FIG. 2 is an overall view schematically showing an inkjet device usable for the production method according to this embodiment. FIG. 3 is a cross-sectional view schematically showing an inkjet head in the inkjet device shown in FIG. 2. FIG. 4 is an enlarged photograph of a gold decoration of a printed item produced by the production method according to this embodiment.

In the method for producing a printed item according to this embodiment, the gold resinate solution for inkjet printing according to the above-described embodiment is used. Specifically, as shown in FIG. 2, an inkjet device 1 used in the production method according to this embodiment includes five types of inkjet heads 10 for cyan (C), yellow (Y), magenta (M), black (K) and gold (G). Among these inkjet heads 10, the inkjet head 10 for gold (G) stores the gold resinate solution for inkjet printing according to the above-described embodiment.

As the inkjet head 10, a piezo-type inkjet head, for example, is used. As shown in FIG. 3, the piezo-type inkjet head 10 includes a case 12 accommodating a storage portion 13 storing the gold resinate solution. The storage portion 13 in the case 12 is in communication with an ejection portion 16 via a liquid transmission path 15. The ejection portion 16 is provided with an ejection opening 17 and a piezo element 18. The piezo element 18 is located so as to face the ejection opening 17. The piezo element 18 is vibrated to eject the gold resinate solution in the ejection portion 16 through the ejection opening 17.

The inkjet heads 10 are accommodated in a printing cartridge 40. The printing cartridge 40 has a guide shaft 20 inserted therethrough. The printing cartridge 40 is structured to be movable reciprocally in a horizontal direction X along the guide shaft 20. Although not shown, the inkjet device 1 includes a moving device that moves the guide shaft 20 reciprocally in a vertical direction Y. The inkjet device 1 may move the inkjet heads 10 to a desired position by a combination of the reciprocal movements in the horizontal direction X and the vertical direction Y.

Now, a method for producing a printed item by use of the inkjet device 1 will be described.

In the production method according to this embodiment, first, an inorganic substrate W is prepared. The inorganic substrate W refers to a target of printing, on which printing is to be performed, and the target of printing does not include a layer, absorbing the gold resinate solution or ink, at a surface thereof, and needs to have the gold resinate solution (ink) fixed to the surface thereof by a firing step described below. There is no specific limitation on the use, thickness, shape, color or hardness of the inorganic substrate W. The inorganic substrate W may be a ceramic item such as a pottery or porcelain item, a glass item, a vitreous enamel item or the like, or a substrate board for an electronic circuit, a reflective film or the like. Namely, the gold resinate solution for inkjet printing according to this embodiment is usable to form an electronic circuit, a reflective film or the like as well as a gold decoration on a ceramic item.

In this embodiment, next, the above-described gold resinate solution for inkjet printing is ejected through the ejection opening 17 of the inkjet device 1 to attach the gold resinate solution for inkjet printing onto the surface of the inorganic substrate W. Specifically, the inorganic substrate W is first located on a stage (not shown) of the inkjet device 1, and the printing cartridge 40 is moved such that the inkjet heads 10 are located above the inorganic substrate W. Then, the gold resinate solution is ejected through the ejection opening 17 while the printing cartridge 40 is moved in accordance with the shape of a pattern to be formed. As a result, a pattern formed of microscopic dot-like liquid drops is drawn on the surface of the inorganic substrate W. In this state, the gold resinate solution may be ejected through the ejection opening 17 in a preferred manner because according to this embodiment, the viscosity of the gold resinate solution is kept low. The gold resinate solution ejected through the ejection opening 17 is of a very small amount (about 1 pl to about 80 pl). Therefore, the inkjet device 1 ejects the gold resinate solution toward the same position a plurality of times such that a gold film of a desired thickness is formed after the firing. The number of times the gold resinate solution is ejected toward the same position (printing times) may be decreased because according to this embodiment, the gold resinate solution contains a sufficient amount of gold. As a result, the production efficiency may be improved, and also the printing unevenness, which would be caused by the dot-like liquid drops being combined on the surface of the inorganic substrate W, may be prevented from being caused.

The ink of the three primary colors and the black ink are also ejected toward the inorganic substrate W in substantially the same procedure as for the ejection of the gold resinate solution described above. The ejection of the ink other than the gold resinate solution does not define the present invention and thus will not be described in detail.

The inorganic substrate W having the desired pattern drawn thereon with the gold resinate solution is fired at a predetermined temperature. As a result, a gold decoration formed of microscopic dot-like gold films (e.g., generally circular gold films each having a diameter of 200 μm or shorter) is formed on the surface of the inorganic substrate W (see FIG. 4). The gold decoration thus formed as an assembly of gold films having a sufficient thickness (50 nm to 100 nm) has a beautifully developed color because according to this embodiment, the gold resinate solution contains a sufficient amount of gold.

The temperature for the above-described firing is set to a temperature lower than a softening temperature of the inorganic substrate W. For example, in the case where the inorganic substrate W is a pottery or a porcelain item, the firing temperature is set to the range of 750° C. to 850° C., and in the case where the inorganic substrate W is a glass item, the firing temperature is set to the range of 450° C. to 600° C. In the case where a glaze is applied onto the surface of the inorganic substrate W, it is preferred to set the firing temperature, in consideration of, also, the softening temperature of the glaze.

As described above, the production method according to this embodiment may produce a printed item having a decoration, formed of microscopic dot-like gold films, formed on the surface of the inorganic substrate W. The production method using inkjet printing does not require the technique of a skilled craftsman unlike brush painting, and is more easily usable, than screen printing, to produce various types of items in small amounts. Therefore, the production method using inkjet printing may significantly improve the production efficiency of a printed item.

Test Examples

Hereinafter, test examples according to the present invention will be described. These test examples are not intended to limit the present invention in any way.

A. Test 1

1. Preparation of Samples

In this test, as shown in Table 1 provided below, 12 types of gold resinate solution (samples 1 through 12) having different $I_{Au}/I_S$ ratios and different contents of gold (% by weight) were prepared.

(1) Preparation of the Gold Resinate Solution

The procedure for preparing samples 1 through 12 will be described below.

First, 22.5 g of flower of sulfur, 100 g of rosin, and 150 g of turpentine were mixed together and heated at 150° C. for about 2 hours. The resultant mixture was distilled until the weight thereof becomes 200 g, and thus an unreacted part was removed. In this manner, balsam sulfide was produced. Separately, pure gold was dissolved in aqua regina (concentrated hydrochloric acid:concentrated nitric acid=3:1) to prepare an aqueous solution of chloroauric acid. Potassium chloride was added to the aqueous solution of chloroauric acid, and then the resultant mixture was heated until the moisture was evaporated. Thus, crystal of potassium chloroaurate was obtained. Next, potassium chloroaurate was dissolved in methanol, and then, while the resultant solution was cooled, a predetermined amount of balsam sulfide was gradually added thereto. In this test, the mixture ratio of the solution of potassium chloroaurate and balsam sulfide was made different among samples 1 through 12. Then, the resultant mixtures were each heated until 60 g of solid substance was obtained. The resultant solid substance was dissolved in chloroform, and anhydrous sodium carbonate was added to the resultant solution to neutralize free hydrochloric acid. Then, the resultant solution was left for about one day while being shaken. Next, the solution was filtrated to remove sodium carbonate, and then the resultant solution was heated to remove an unreacted part of chloroform. Impurities were removed from the solution, and the resultant solution was added to about 1000 ml of methyl alcohol to generate a precipitation containing gold resin balsam sulfide. The precipitation was collected and vacuum-dried at 35° C. In this manner, 12 types of gold resin balsam sulfide powder having different contents of gold with respect to the amount of sulfur were obtained. Next, each type of gold resin balsam sulfide powder (5 g) was dissolved in 20 g of NMP (N-methyl-2-pyrrolidone). Then, a different amount of NMP was added thereto for each sample. As a result, 12 types of gold resinate solution (samples 1 through 12) having different contents of gold were obtained. The content of gold in each sample is shown in Table 1.

(2) Measurement of the $I_{Au}/I_S$ Ratio

The gold resin balsam sulfide powder used in the gold resinate solution in each of samples 1 through 12 was subjected to an element analysis performed by use of X-ray fluorescence analysis. Based on the analysis results, the $I_{Au}/I_S$ ratio was found. The $I_{Au}/I_S$ ratio in each sample is shown in Table 1. The detailed conditions for finding the $I_{Au}/I_S$ ratio are described above, and thus will not be repeated.

2. Evaluation Test

Figure 5:
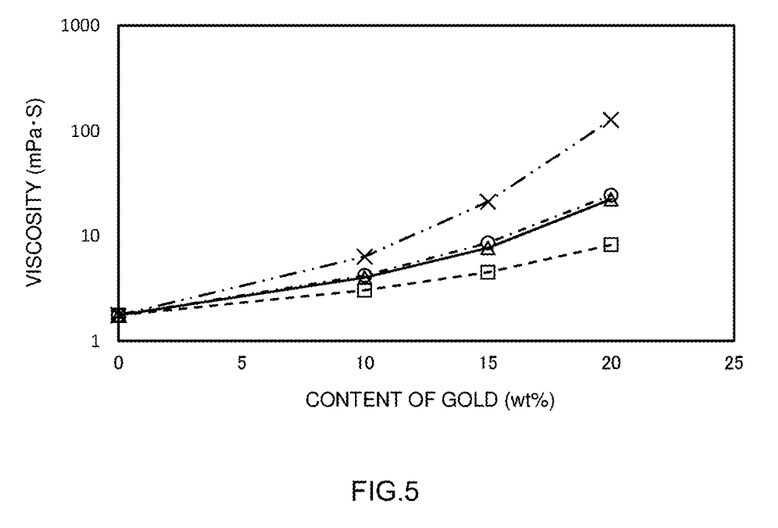
FIG. 5 is a graph showing the relationship among the $I_{Au}/I_S$ ratio, the content of gold (% by weight) and the viscosity (mPa·s) of samples 1 through 13.

The viscosity of the gold resinate solution in each of samples 1 through 12 was measured. In this test, the viscosity of NMP was also measured for comparison. NMP was labeled as sample 13. The conditions for measuring the viscosity are described above, and thus will not be repeated. The measurement results of the viscosity are shown in Table 1. FIG. 5 is a graph showing the relationship among the $I_{Au}/I_S$ ratio, the content of gold (% by weight) and the viscosity (mPa·s). In FIG. 5, the vertical axis represents the viscosity (represented by logarithm), and the horizontal axis represents the content of gold. In FIG. 5, the plot represented with "X" shows samples 1 through 3 having an $I_{Au}/I_S$ ratio of 5.8. The plot represented with "O" shows samples 4 through 6 having an $I_{Au}/I_S$ ratio of 8.5. The plot represented with "A" shows samples 7 through 9 having an $I_{Au}/I_S$ ratio of 8.9. The plot represented with "E" shows samples 10 through 12 having an $I_{Au}/I_S$ ratio of 19.5.

TABLE 1

| | $I_{Au}/I_S$ RATIO | CONTENT OF GOLD (wt. %) | VISCOSITY (mPa · s) |
|---|---|---|---|
| SAMPLE 1 | 5.8 | 10 | 6.35 |
| SAMPLE 2 | 5.8 | 15 | 21.10 |
| SAMPLE 3 | 5.8 | 20 | 128.00 |
| SAMPLE 4 | 8.5 | 10 | 4.20 |
| SAMPLE 5 | 8.5 | 15 | 8.58 |
| SAMPLE 6 | 8.5 | 20 | 24.40 |
| SAMPLE 7 | 8.9 | 10 | 4.01 |
| SAMPLE 8 | 8.9 | 15 | 7.68 |
| SAMPLE 9 | 8.9 | 20 | 22.30 |
| SAMPLE 10 | 19.5 | 10 | 3.04 |
| SAMPLE 11 | 19.5 | 15 | 4.50 |
| SAMPLE 12 | 19.5 | 20 | 8.22 |
| SAMPLE 13 | — | 0 | 1.76 |

As shown in Table 1 above and FIG. 5, it has been confirmed that a sample having a higher $I_{Au}/I_S$ ratio has a milder rise in the viscosity caused by an increase in the content of gold. It has also been confirmed that there is a significant difference in the effect of suppressing the rise in the viscosity between samples 1 through 3 having an $I_{Au}/I_S$ ratio of 5.8 and samples 4 through 6 having an $I_{Au}/I_S$ ratio of 8.5. From these results, it has been found out that in the case where the $I_{Au}/I_S$ ratio of gold resin balsam sulfide is 8.5 or higher, the content of gold is allowed to be increased while the viscosity is kept low.

B. Test 2

1. Preparation of Samples 14 Through 33

In this test, 24 types of gold resinate solution (samples 14 through 22 and samples 24 through 32) having different $I_{Au}/I_S$ ratios and different contents of gold were prepared in the same procedure as in test 1 except that the solvent was different from that in test 1. Specifically, for samples 14 through 22, benzyl alcohol was used as the solvent, and for samples 24 through 32, benzaldehyde was used as the solvent. In this test, sample 23, in which balsam sulfide was dissolved in benzyl alcohol, and sample 33, in which balsam sulfide was dissolved in benzaldehyde, were also prepared for comparison. The $I_{Au}/I_S$ ratio of each sample was measured by the same procedure as in test 1. Table 2 shows the $I_{Au}/I_S$ ratio of each of samples 14 through 22 using benzyl alcohol, and Table 3 shows the $I_{Au}/I_S$ ratio of each of samples 24 through 32 using benzaldehyde.

2. Evaluation Test

Figure 6:
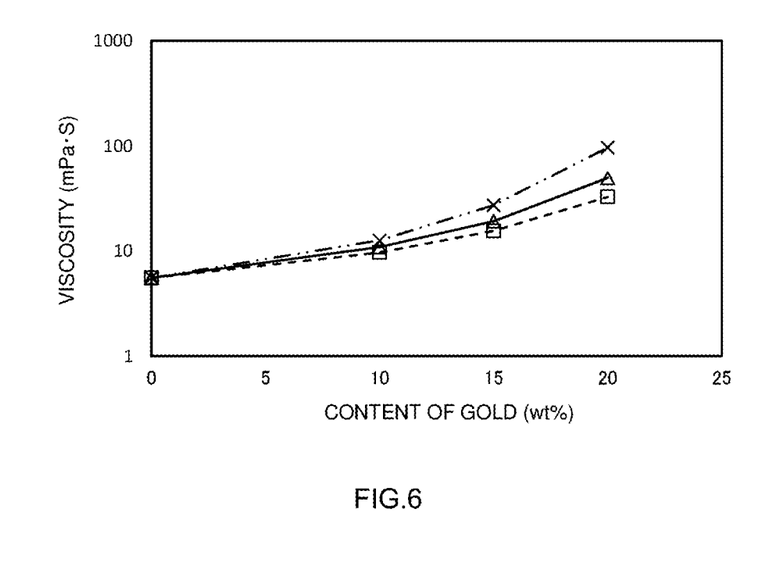
FIG. 6 is a graph showing the relationship among the $I_{Au}/I_S$ ratio, the content of gold (% by weight) and the viscosity (mPa·s) of samples 14 through 23.

The viscosity of each of samples 14 through 33 was measured by the same procedure as in test 1. Table 2 shows the measurement results of the viscosity of samples 14 through 23 using benzyl alcohol as the solvent. FIG. 6 is a graph showing the relationship among the $I_{Au}/I_S$ ratio, the content of gold (% by weight) and the viscosity (mPa·s) of samples 14 through 23. In FIG. 6, the plot represented with "X" shows samples 14 through 16 having an $I_{Au}/I_S$ ratio of 5.8. The plot represented with "Δ" shows samples 17 through 19 having an $I_{Au}/I_S$ ratio of 8.9. The plot represented with "□" shows samples 20 through 22 having an $I_{Au}/I_S$ ratio of 19.5.

TABLE 2

| | $I_{Au}/I_S$ RATIO | CONTENT OF GOLD (wt. %) | VISCOSITY (mPa · s) |
|---|---|---|---|
| SAMPLE 14 | 5.8 | 10 | 12.60 |
| SAMPLE 15 | 5.8 | 15 | 27.20 |
| SAMPLE 16 | 5.8 | 20 | 97.10 |
| SAMPLE 17 | 8.9 | 10 | 10.90 |
| SAMPLE 18 | 8.9 | 15 | 19.10 |
| SAMPLE 19 | 8.9 | 20 | 49.40 |
| SAMPLE 20 | 19.5 | 10 | 9.66 |
| SAMPLE 21 | 19.5 | 15 | 15.50 |
| SAMPLE 22 | 19.5 | 20 | 32.60 |
| SAMPLE 23 | — | 0 | 5.54 |

Figure 7:
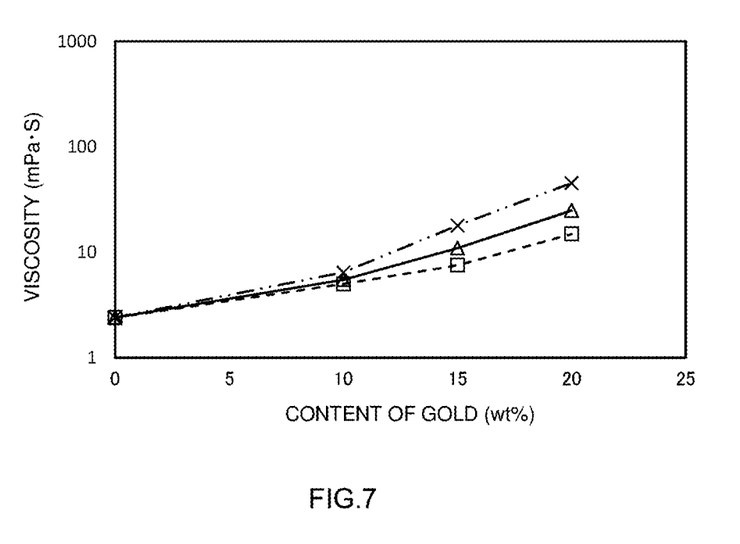
FIG. 7 is a graph showing the relationship among the $I_{Au}/I_S$ ratio, the content of gold (% by weight) and the viscosity (mPa·s) of samples 24 through 33.

Table 3 shows the measurement results of the viscosity of samples 24 through 33 using benzaldehyde as the solvent. FIG. 7 is a graph showing the relationship among the $I_{Au}/I_S$ ratio, the content of gold (% by weight) and the viscosity (mPa·s) of samples 24 through 33. In FIG. 7, the plot represented with "X" shows samples 24 through 26 having an $I_{Au}/I_S$ ratio of 5.8. The plot represented with "A" shows samples 27 through 29 having an $I_{Au}/I_S$ ratio of 8.9. The plot represented with "Q" shows samples 30 through 32 having an $I_{Au}/I_S$ ratio of 19.5.

TABLE 3

| | $I_{Au}/I_S$ RATIO | CONTENT OF GOLD (wt. %) | VISCOSITY (mPa · s) |
|---|---|---|---|
| SAMPLE 24 | 5.8 | 10 | 6.42 |
| SAMPLE 25 | 5.8 | 15 | 17.80 |

TABLE 3-continued

|  | $I_{Au}/I_S$ RATIO | CONTENT OF GOLD (wt. %) | VISCOSITY (mPa · s) |
|---|---|---|---|
| SAMPLE 26 | 5.8 | 20 | 44.80 |
| SAMPLE 27 | 8.9 | 10 | 5.46 |
| SAMPLE 28 | 8.9 | 15 | 10.90 |
| SAMPLE 29 | 8.9 | 20 | 24.70 |
| SAMPLE 30 | 19.5 | 10 | 4.98 |
| SAMPLE 31 | 19.5 | 15 | 7.50 |
| SAMPLE 32 | 19.5 | 20 | 14.80 |
| SAMPLE 33 | — | 0 | 2.40 |

As shown in Tables 2 and 3 and FIG. 6 and FIG. 7, it has been confirmed that even in the case where a solvent other than NMP is used, as long as the $I_{Au}/I_S$ ratio is high, the content of gold is allowed to be increased while the viscosity is kept low. From these results, it has been found out that the effect provided by increasing the $I_{Au}/I_S$ ratio is exhibited regardless of the type of the solvent.

Specific examples of the present invention have been described above. These examples are merely illustrative, and do not limit the scope of the present invention in any way. The technology described in the claims encompasses various modifications and alterations of the specific examples described above.

REFERENCE SIGNS LIST

1 Inkjet device
10 Inkjet head
12 Case
13 Storage portion
15 Liquid transmission path
16 Ejection portion
17 Ejection opening
18 Piezo element
20 Guide shaft
40 Printing cartridge
X Horizontal direction
Y Vertical direction

The invention claimed is:

1. A gold resinate solution for inkjet printing usable to provide an inorganic substrate with a gold decoration by inkjet printing, the gold resinate solution comprising:
   gold resin balsam sulfide; and
   a solvent dissolving the gold resin balsam sulfide,
   wherein the gold resin balsam sulfide has a ratio ($I_{Au}/I_S$ ratio) of a peak intensity $I_{Au}$ derived from gold element (Au) with respect to a peak intensity $I_S$ derived from sulfur element (S), in X-ray fluorescence analysis, of 8.5 or higher.

2. The gold resinate solution according to claim 1, wherein the gold resinate solution contains the gold element in a range of 5% by weight to 20% by weight.

3. The gold resinate solution according to claim 2, wherein the gold resinate solution has a viscosity of 25 mPa·s or lower.

4. The gold resinate solution according to claim 2, wherein the solvent contains at least one selected from the group consisting of N-methyl-2-pyrrolidone, benzyl alcohol and benzaldehyde.

5. A method for producing a printed item, the method comprising the steps of:
   preparing an inorganic substrate;
   ejecting the gold resinate solution according to claim 2 through an ejection opening of an inkjet device and attaching the gold resinate solution onto a surface of the inorganic substrate; and
   firing the inorganic substrate having the gold resinate solution attached thereto.

6. The gold resinate solution according to claim 1, wherein the gold resinate solution has a viscosity of 25 mPa·s or lower.

7. The gold resinate solution according to claim 6, wherein the solvent contains at least one selected from the group consisting of N-methyl-2-pyrrolidone, benzyl alcohol and benzaldehyde.

8. A method for producing a printed item, the method comprising the steps of:
   preparing an inorganic substrate;
   ejecting the gold resinate solution according to claim 6 through an ejection opening of an inkjet device and attaching the gold resinate solution onto a surface of the inorganic substrate; and
   firing the inorganic substrate having the gold resinate solution attached thereto.

9. The gold resinate solution according to claim 1, wherein the solvent contains at least one selected from the group consisting of N-methyl-2-pyrrolidone, benzyl alcohol and benzaldehyde.

10. A method for producing a printed item, the method comprising the steps of:
    preparing an inorganic substrate;
    ejecting the gold resinate solution according to claim 9 through an ejection opening of an inkjet device and attaching the gold resinate solution onto a surface of the inorganic substrate; and
    firing the inorganic substrate having the gold resinate solution attached thereto.

11. A method for producing a printed item, the method comprising the steps of:
    preparing an inorganic substrate;
    ejecting the gold resinate solution according to claim 1 through an ejection opening of an inkjet device and attaching the gold resinate solution onto a surface of the inorganic substrate; and
    firing the inorganic substrate having the gold resinate solution attached thereto.

* * * * *